Patented Aug. 19, 1952

2,607,759

UNITED STATES PATENT OFFICE 2,607,759

SALTS OF HEXAMETHYLENETETRAMINIUM BASES AS LATENT CURING CATALYSTS

John A. Yourtee, Fredericksburg, Va., assignor to American Viscose Corporation, Wilmington, Del., a corporation of Delaware No Drawing. Application June 17, 1949, Serial No. 99,856

14 Claims. (Cl. 260—67.6)

This invention relates to stable compositions containing potentially thermosetting, acid-curing condensates or resins. More particularly, the invention is concerned with such compositions which include a latent curing catalyst, especially compositions in which the condensate or resin is a urea-formaldehyde condensate or resin.

Most of the catalysts which have been proposed previously for use with acid-curing thermosetting resins cause the resins to partially or wholly cure at relatively low temperatures. If compositions containing such catalysts, together with an uncured acid-curing thermosetting resin, are stored the resin may be partially or wholly cured even at normal temperature. This results, in the case of molding powders, in a loss of proper flow characteristics and therefore in loss of utility. Furthermore, if it is desired to subject the composition comprising the resin and catalyst to preliminary mild heating without curing, as may be necessary in many applications, such as in coating or impregnating textiles, in laminating, etc., then it is essential to use a curing catalyst which is inactive at low temperatures but which will function to expedite curing of the resin at higher temperatures.

One object of this invention is to provide new latent catalysts or accelerators for acid-curing thermosetting resins. Another object is to provide compositions comprising a thermosetting resin and a latent acid-curing catalyst which are stable at ordinary temperatures and exhibit improved curing and molding properties. Another object is to provide compositions having improved water resistance, and flow characteristics which are not altered, during storage, i. e., flow characteristics which, during storage, are not affected by the catalyst.

These and other objects are attained by mixing with the acid-curing thermosetting precondensate or resin, or compositions containing the precondensate or resin, as a latent curing catalyst, a salt of a quaternary hexamethylenetetraminium base having the general formula $$(C_6H_{12}N_4)_mR_nX_p$$

wherein R is an aliphatic hydrocarbon radical, X is the anion of an organic or inorganic acid which, in the free state, accelerates curing of the thermosetting resin under heating, $p$ is an integer from 1 to 4, $m$ is an integer equal to $1p$ to $4p$, and $n$ is an integer from unity to $4p$.

In the formula given, R may represent alkyl, alkylene, alkenyl, alkylidene, cycloalkyl radicals etc., an aryl-substituted aliphatic hydrocarbon radical, or an alkyl group attached to an oxygen containing radical selected from the group consisting of alkyloxy, amino carbonyl, aryl carbonyl, alkoxy carbonyl, and aryloxy carbonyl. For example, R may be methyl, ethyl, isopropyl, hexyl, heptyl, cetyl, cyclohexyl, allyl, benzyl, carbamylmethyl, benzoylmethyl, etc. The anion may be, for instance, chloride, bromide, iodide, sulfate, benzene sulfonate, chromate, thiocyanate, formate, benzoate, etc.

Representative compounds which are used as latent curing catalysts in accordance with the invention are:

Methyl hexamethylenetetraminium iodide
Bis (methyl hexamethylenetetraminium) sulfate
Methyl hexamethylenetetraminium thiocyanate
Methyl hexamethylenetetraminium benzoate
Ethyl hexamethylenetetraminium bromide
Ethyl hexamethylenetetraminium iodide
Isopropyl hexamethylenetetraminium benzene sulfonate
Heptyl hexamethylenetetraminium iodide
Cetyl hexamethylenetetraminium iodide
Methylene dihexamethylenetetraminium diiodide
Benzyl hexamethylenetetraminium chloride
Carbamylmethyl hexamethylenetetraminium
Carbamylmethyl hexamethylenetetraminium chloride
Benzoylmethyl hexamethylenetetraminium bromide
Carbethoxymethyl hexamethylenetetraminium chloride
Carbophenoxymethyl hexamethylenetetraminium bromide
2,3-oxypropyl hexamethylenetetraminium chloride
Methoxymethyl hexamethylenetetraminium chloride
Bis (methyl hexamethylenetetraminium) dichromate Preferably, the salt of the quaternary hexamethylenetetraminium base has a melting and decomposition temperature, in the pure condition, between 70° C. and 200° C. The catalyst does not become active, i. e., the acid is not liberated, until the molding temperature is reached. Generally, the compositions are molded at a temperature between 135 and 165° C.

Various fillers may be incorporated with the acid-curing thermosetting resin such as, for example, wood flour, asbestos, cotton linters, cellophane or other forms of regenerated cellulose, clay, etc. Coloring materials and lubricants may be included, if desired. Zinc stearate or other mold lubricant may be added. In some applications, it may be desirable, also, to add modifying agents such as starches, gums, alginates, casein, etc. Plasticizing or impregnating agents may also be incorporated in the molding composition.

Molding compositions may be prepared by any of the methods known in the art. For example, a resin syrup may be prepared first and the filler impregnated with the syrup in a subsequent operation, or the filler may be impregnated with the resin-forming constituents, and the resin-forming reaction initiated or furthered during drying of the mass. The filler content in percentage, the composition of the resin (mole ratio of the resin-forming constituents and proportions of minor reactants or assistants), and the processing conditions may be varied as well known in the art. Generally, when the composition is a molding composition containing the resin and a filler, the resin is preferably present in an amount of from 60 to 70 parts, the filler being present in an amount of from 30 to 40 parts.

The salt of the hexamethylenetetraminium base, either in the purified condition, or in the crude state, may be added at any point in the processing of the molding composition where subsequent treatment will not cause premature catalyst activity or destruction of the catalyst.

Usually only a small portion of the latent catalyst of the invention is required to produce rapid cures under molding conditions, for example from 0.1 to about 2% by weight of the molding composition. Generally, the molding is performed at a temperature between about 135 and 165° C.

The following examples of my invention are given by way of illustration and not of limitation.

Example I

A dried, substantially neutral urea-formaldehyde molding composition containing 35 parts of a cellulose pulp filler impregnated with 65 parts of a urea-formaldehyde reaction product was ground in a cooled ball mill with 0.25 part of methyl hexamethylenetetraminium iodide. The composition was sifted. It may be used for molding either in powder form or after subsequent granulation.

Zinc stearate or other mold lubricant may be added to the composition.

Example II

A dried, substantially neutral urea-formaldehyde molding composition containing 35 parts of a cellulose pulp filler impregnated with 65 parts of a urea-formaldehyde reaction product was ground in a cooled ball mill with 0.50 part of cetyl hexamethylenetetraminium iodide.

Test moldings of the composition were prepared at 2500 p. s. i., 280° F., and the moldings were tested for water absorption and flow, and compared with moldings prepared under the same conditions using a dry composition comprising the urea-formaldehyde impregnated filler, but which did not contain the latent catalyst. The flow characteristics of the composition containing the catalyst remained unchanged. The water absorption and surface appearance after 15 minutes immersion in boiling water compared as follows:

|  | Without Catalyst | With Catalyst |
|---|---|---|
| Water Absorption_____percent__ | 3.1 | 2.2 |
| Surface Appearance_____ | Good | Excellent |

Example III

A dried, substantially neutral urea-formaldehyde molding composition containing 35 parts of a cellulose pulp filler impregnated with 65 parts of a urea-formaldehyde reaction product was ground in a cooled ball mill with 0.25 part of ethyl hexamethylenetetraminium iodide.

Example IV

A dried, substantially neutral molding composition containing 30 parts of a cellulose pulp filler impregnated with 70 parts of a melamine-urea-formaldehyde reaction product in which the molar ratio of melamine to urea was 1:9, was ground in a cooled ball mill with 0.50 part of cetyl hexamethylenetetraminium iodide.

The inclusion of a small amount, from 0.01 to 0.1% by weight of hexamethylenetetramine during the incorporation of the salt of the hexamethylenetetramine base may be found favorable, and will assist in stabilizing the pH of the composition. Other agents for controlling or regulating the pH of the composition may be used.

Other acid-curing thermosetting resins may be substituted for all or part of the resins employed in the examples. The term "acid-curing resin" includes those condensates or resins which may be cured only under acid conditions and also those which may be cured under either acid or alkaline conditions. Such resins include those obtained by reacting an aldehyde, e. g., formaldehyde, acetaldehyde, benzaldehyde, furfuraldehyde, etc. with the following: thiourea, the reaction products obtained by heating and decomposing dicyandiamide, melamine, other amino triazines, etc. The molding composition may also contain mixed resins, e. g., urea-melamine-formaldehyde resins, urea-thiourea-formaldehyde resins, etc.

Special advantages, additional to the acceleration of the acid-curing under molding conditions, may be obtained by appropriate selection of the particular salt of a hexamethylenetetraminium base used as latent catalyst. For example, the residue from the aliphatic hydrocarbon groups of higher molecular weight, such as the cetyl radical, functions as a molding lubricant for the composition, and results in improved flow in the mold as well as improved resistance to water and organic solvents, improved strength, etc.

The time required to cure compositions comprising an acid-curing thermosetting resin and a salt of a quaternary hexamethylenetetraminium base as disclosed herein, will vary somewhat with the size of the piece being molded, the particular catalyst used, the particular resin, and with the curing temperature. In general, the time required for molding small articles is between about one half minute and three minutes at temperatures between about 135 to 165° C., at pressures of from 3000 to 5000 pounds per square inch.

The catalysts described herein may be employed in molding powders or in solid compositions which have been prepared for hot pressing into sheets, rods, or other units, as well as in compatible syrups containing acid-curing thermosetting resins for use in coating, impregnating, or laminating compositions, adhesives, etc. The compositions containing the latent catalysts of the invention are stable commercially i. e. they are stable at normal temperatures and may be stored safely.

Obviously many modifications and variations in the process and compositions described above may be made without departing from the spirit and scope of the invention as defined in the appended claims.

I claim:

1. A molding composition as in claim 8, wherein the acid-curing resin is a urea-formaldehyde resin.

2. A molding composition as in claim 8, wherein the acid-curing resin is a melamine-formaldehyde resin.

3. A molding composition as in claim 8, wherein the acid-curing resin is a melamine-urea-formaldehyde resin.

4. A molding composition as in claim 8, wherein the acid-curing resin is a thiourea-formaldehyde resin.

5. A process as in claim 9, wherein the acid-curing thermosetting resin is a urea-formaldehyde resin.

6. A process as in claim 9, wherein the acid-curing thermosetting resin is a melamine-formaldehyde resin.

7. A process as in claim 9, wherein the acid-curing thermosetting resin is a melamine-urea-formaldehyde resin.

8. As a new composition of matter, a substantially dry and neutral molding composition comprising an acid-curing thermosetting resin and a latent curing catalyst which is acid-curing at temperatures in the range of 135° to 165° C., said catalyst being a salt of a hexamethylenetetraminium base having the general formula $$(C_6H_{12}N_4)_m R_n X_p$$

wherein R is selected from the group consisting of aliphatic hydrocarbon radicals, aryl-substituted aliphatic hydrocarbon radicals, and aliphatic hydrocarbon radicals containing an alkyl group attached to an oxygen containing radical selected from the group consisting of alkyloxy, amino carbonyl, aryl carbonyl, alkoxy carbonyl, and aryloxy carbonyl, X is the anion of an acid which, in the free state, accelerates curing of the thermosetting resin, $p$ is an integer from 1 to 4, $m$ is an integer equal to $1p$ to $4p$, and $n$ is an integer from unity to $4p$, said molding composition being stable at normal storage temperatures below 135° C.

9. A process for curing an acid-curing thermosetting resin which comprises mixing the dry resin with a salt of a quaternary hexamethylenetetraminium base having the general formula $$(C_6H_{12}N_4)_m R_n X_p$$

wherein R is selected from the group consisting of aliphatic hydrocarbon radicals, aryl-substituted aliphatic hydrocarbon radicals, and aliphatic hydrocarbon radicals containing an alkyl group attached to an oxygen containing radical selected from the group consisting of alkyloxy, amino carbonyl, aryl carbonyl, alkoxy carbonyl, and aryloxy carbonyl, X is the anion of an acid which, in the free state, accelerates curing of the thermosetting resin, $p$ is an integer from 1 to 4, $m$ is an integer equal to $1p$ to $4p$, and $n$ is an integer from unity to $4p$, as a latent curing catalyst, and subjecting the mixture to a temperature of at least about 135° C.

10. A composition of matter as defined in claim 8 wherein the latent curing catalyst is methyl hexamethylenetetraminium iodide.

11. A composition of matter as defined in claim 8 wherein the latent curing catalyst is cetyl hexamethylenetetraminium iodide.

12. A composition of matter as defined in claim 8 wherein the latent curing catalyst is ethyl hexamethylenetetraminium bromide.

13. A composition of matter as defined in claim 8 wherein the latent curing catalyst is methyl hexamethylenetetraminium benzoate.

14. A composition of matter as defined in claim 8 wherein the latent curing catalyst is heptyl hexamethylenetetraminium iodide.

JOHN A. YOURTEE.

REFERENCES CITED

The following references are of record in the file of this patent:

UNITED STATES PATENTS

| Number | Name | Date |
|--------|------|------|
| 2,059,609 | Rossiter | Nov. 3, 1936 |
| 2,156,124 | Novotny | Apr. 25, 1939 |
| 2,322,566 | D'Alelio | June 22, 1943 |
| 2,326,725 | Jayne | Aug. 10, 1943 |
| 2,331,862 | Shepard | Oct. 12, 1943 |

FOREIGN PATENTS

| Number | Country | Date |
|--------|---------|------|
| 160,258 | Great Britain | Mar. 15, 1921 |